Patented Nov. 8, 1927.

1,648,179

UNITED STATES PATENT OFFICE.

SIDNEY MARION HULL, OF WESTERN SPRINGS, ILLINOIS, ASSIGNOR TO WESTERN ELECTRIC COMPANY, INCORPORATED, OF NEW YORK, N. Y., A CORPORATION OF NEW YORK.

ORGANIC MOLDING COMPOSITION.

No Drawing.    Application filed June 13, 1924. Serial No. 719,742.

This invention relates in general to organic molding compositions, and more particularly to the production of new plastic compounds from a protein and an aldehyde. The condensation of casein, glue, gelatine and other proteids with formaldehyde and acetaldehyde has been known for some time; and the products so formed have been more or less extensively used in the industrial field. Plastic materials formed from casein and formaldehyde and marketed under the names of galalith, omnilith, erinoid, sicalite, cornoid, etc., have been used as substitutes for ivory, bone, celluloid, and the like.

Heretofore such reactions have always been carried out in the presence of water. The reaction between formaldehyde and proteins is so rapid that there has never been enough time to mold materials of this type when the formaldehyde was compounded with the other ingredients. Consequently the usual practice has been to mold or shape the protein plus the various fillers, using water as a plasticizing medium and subsequently immerse the articles so formed in a bath of formaldehyde, or expose them to the vapors of the same. This exposure usually lasted from several days to weeks, depending upon the size of the article treated. Moreover, due to the penetration of water into the entire mass just as long a time was necessarily provided for, to dry out the resultant products. During the drying operation these compounds shrink and warp a great deal so that it has been practically impossible to mold them to the size and shape desired.

Plastic materials manufactured by this process have always had the disadvantage of being rather hygroscopic and of swelling when exposed to moisture.

One object of the present invention is to produce a compound of a protein and an aldehyde which can be molded without the use of water as a plasticizing agent.

Another object of the invention is to produce a proteid-aldehyde mixture containing all the necessary ingredients so that condensation will take place slowly enough to permit articles to be molded therefrom before complete reaction takes place.

Another object of the invention is to produce an improved water resistant compound formed from the condensation of protein with an aldehyde.

A further object of the invention is to produce a hardening of casein by reaction with a substantially anhydrous aldehyde.

The invention consists in mixing together the required amounts of casein and furfural and then subjecting them to heat and pressure to cause a more rapid condensation. A filler may be added to the casein before mixing and the compound may be further waterproofed by incorporating therewith another material which is water-resistant per se or in combination with the compound. This water resistant material is added preferably by dissolving it in the furfural before the admixture of the furfural and casein.

Other objects and features of the invention will appear from the following description and will be particularly pointed out in the appended claims.

According to the preferred form of the invention casein or other proteids, such as glue or gelatine in a dry state, are ground to a fine powder and mixed with the required amount of furfural to bring about complete condensation. In forming this preliminary mixture of casein and furfural, there is a great deal of latitude, but a proportion which has given good results is 10 parts of casein to one part of furfural. By varying the amount of furfural used the properties of the final product may be changed and to a certain degree controlled. The ideal condition to obtain optimum properties is to employ proportions of casein and furfural so that after condensation no free furfural or casein will be present. In general the use of a less amount of furfural gives a softer final product.

When the casein and furfural are mixed together they present the appearance of a moistened mass. This mass may be molded into shape under pressure and while in the press, heat being applied for various lengths of time depending upon the nature of the specific product desired. In general the temperature should be between 175° F. and 225° F. and the pressure should also be consistent with the density required in the final product. The duration of heating may be from 10 minutes to an hour. The material so produced is a hard resilient plastic mass, resembling bakelite, redmanol and similar materials, and a conchoidal glassy fracture is shown when it is broken.

When casein is mixed with furfural the condensation takes place slowly so that sufficient time exists for the satisfactory commercial handling of the material. For instance, a mixture of furfural and casein may be allowed to stand at room temperatures for three or four days before any noticeable hardening results.

The product of the condensation of furfural and casein when produced under heat and pressure is in general considerably more waterproof than other protein-aldehyde compounds. However, in order to increase the resistance to moisture of this product, advantage may be taken of the solvent properties of furfural for a wide variety of materials. For instance, a rosin-glycerol ester may be dissolved in the furfural in the proportion of one to one, and this solution used for the condensation with casein. Using a gum in this form it is spread uniformly throughout the entire mass and renders the plastic quite resistant to moisture. Other materials such as cellulose-esters; various gums and resins, either natural or synthetic; bituminous materials; tung oil and other polymerizable oils with or without being previously heat treated; waxes and the like may be incorporated in the same manner. Other solvents than furfural may be used for dissolving and distributing the waterproofing agents, but when other solvents are used it is preferable that they be inert, organic, volatile and miscible in all proportions with furfural. Such solvents may be acetone, benzene and its homologues, or other well-known organic solvents.

In forming a compound of the type described, inert fillers may be incorporated for the purpose of reducing the cost of the product and otherwise changing its properties. A satisfactory manner of introducing the fillers into the compound is to grind them with the casein or mix them in any satisfactory manner, before the admixture of the casein and furfural. As an alternative when conditions and the type of materials used might require the furfural and casein might be mixed first and the mixture kneaded with the filler so as to obtain an even distribution throughout. Inert materials which may be used satisfactorily in this connection may be slate dust, magnesia, infusorial earth, wood flour, asbestos fibre, mica dust and other similar materials.

As an example of the foregoing, a composition which would incorporate the main features of the invention as described above, may be produced in the following manner: 50 parts of finely ground casein are thoroughly mixed with 40 parts of finely ground slate dust and the whole intimately mixed with 5 parts of furfural in which has been previously dissolved an equal weight, (5 parts), of a rosin-glycerol ester. The resultant moist plastic mass is then molded under 2500 pounds pressure per square inch with simultaneous application of heat at 212° F. for about 30 minutes. The material so formed is a hard, dense substance, resembling natural slate in appearance, but lighter in weight, possessing considerable resiliency and a fair degree of mechanical strength.

The particular features of importance in the invention are that the molding time is much shorter than for other protein-aldehyde compounds, and articles can be molded to form, there being practically no shrinkage or distortion. The manufacture of molded articles from, for instance, casein and formaldehyde requires sometimes as much as a month's time and then additional time is required for drying. Articles can be molded in the manner and from the materials disclosed herein in two hours; and since the water evolved during the chemical reaction is the only water present, and this is very small, no time is needed for drying. The material formed from the condensation of casein with furfural on account of its comparatively slight hygroscopicity may be employed as an electrical insulator, or for fabricating articles which are preferably resistant to the passage of electricity. In general the material may be employed to fashion articles which are usually made of bone, horn, ivory, celluloid or the like.

The term "substantially anhydrous" in the foregoing description and in the appended claims is used to designate a substance which is not strictly anhydrous in the physical chemical sense of the word but which may contain water only as an impurity and not as a diluent.

What is claimed is:

1. A method for producing a plastic compound which consists in condensing a protein with a substantially anhydrous aldehyde.

2. A method for producing a plastic compound which consists in condensing casein with a substantially anhydrous aldehyde.

3. A method for producing a plastic compound which consists in condensing a protein with furfural which has been rendered substantially anhydrous.

4. A method for producing a plastic compound which consists in condensing casein with furfural which has been rendered substantially anhydrous.

5. A method for producing a plastic compound which consists in condensing a material containing a protein with an aldehyde, the reaction taking place substantially in the absence of water.

6. A method for producing a plastic compound which consists in condensing a protein with a solution of an aldehyde in a substantially anhydrous medium.

7. A method for producing a plastic compound which consists in condensing casein with a solution of an aldehyde in a substantially anhydrous medium.

8. As a new article of manufacture, a plastic compound formed by the condensation of a protein with a substantially anhydrous aldehyde.

9. As a new article of manufacture, a plastic compound formed by the condensation of casein with a substantially anhydrous aldehyde.

In witness whereof, I hereunto subscribe my name this 7th day of June A. D., 1924.

SIDNEY MARION HULL.